Patented Apr. 16, 1946

2,398,483

UNITED STATES PATENT OFFICE 2,398,483

MONO-FLUORO-DICHLORO-STYRENE AND THE MANUFACTURE OF THE SAME

Viktor Weinmayr, Pitman, N. J., assignor to E. I. du Pont de Nemours & Company, Wilmington, Del., a corporation of Delaware No Drawing. Application August 12, 1944, Serial No. 549,300

4 Claims. (Cl. 260—651)

This invention relates to new halogenated styrenes, and especially to mono-fluoro-dichlorostyrene and processes for manufacturing the same.

It is an object of the present invention to provide compounds of the benzene series substituted by a halogenated unsaturated hydrocarbon group which can be used alone or for making other compounds, such as intermediates for dyestuffs. Other objects of the invention will be apparent from the following description.

The objects of the invention are attained in general by reacting phenyl-pentachloro-ethane with hydrofluoric acid in the presence of iron at elevated temperatures and preferably at superatmospheric pressures.

The invention will be more fully set forth in the following more detailed description which includes examples that are given as illustrative embodiments of the invention and not as limitations thereof. Parts are expressed in parts by weight unless otherwise noted.

Example I

Six hundred and ninety parts of phenyl-pentachloro-ethane and 1700 parts of technical anhydrous hydrofluoric acid are charged into a steel pressure vessel. The charge is agitated and the temperature is raised gradually over a period of 8 hours until 150° C. is reached. The charge is then cooled and discharged onto ice and water. The mixture is treated with carbon tetrachloride for extracting the reaction product. The resulting carbon tetrachloride extract is washed acid-free, and dried over anhydrous sodium carbonate.

This solution is subjected to a preliminary distillation and 235 parts of distillate are collected, distilling from 70°–100° C. at a pressure of 0.6 mm. Hg. Upon re-fractionation, 68 parts of di-chloro-mono-fluoro-styrene, distilling at 75° C. at a pressure of 0.7 mm. are obtained. The product is a colorless liquid which is stable under ordinary atmospheric conditions and which does not solidify when cooled in an alcohol-carbon ice bath. The analysis of the product and its content of fluorine and chlorine shows it to be dichloro-mono-fluoro-styrene.

As a second fraction, 141 parts of trichloro-styrene, distilling at 98° C./0.9 mm., is obtained.

Dichloro-mono-fluoro-styrene is represented by the formula $C_6H_5—C_2Cl_2F$.

Similar results are obtained by carrying out the foregoing process in a vessel composed of nickel and immersing iron powder in the reaction mixture. For best results, iron in excess of that which is converted to salts of iron is desirable.

Example II

Two hundred and forty parts of phenyl-pentachloro-ethane and 480 parts of technical anhydrous hydrofluoric acid are charged into a closed steel pressure vessel. The temperature is raised gradually over a period of six hours until a temperature of 150° C. is reached. The charge is agitated at 150–155° C. for six hours and then cooled. The hydrochloric acid formed is released and the charge is poured into ice and water. The reaction product, which precipitates as an oil, is separated, neutralized with aqueous ammonia and given a preliminary purification by steam distillation.

Upon fractionation phenyl-trichloro-difluoro ethane distills over first. Then dichloro-mono-fluoro-styrene distills at 75° C. and a pressure of 0.7 mm. A further distillate consisting of 1,2',2'-trichloro-styrene may also be obtained.

In carrying out the process a large excess of hydrofluoric acid over a molecular proportion and pressures higher than atmospheric pressure effect the reaction favorably, but lower yields in a given time can be produced with smaller excesses of hydrofluoric acid and at lower pressures than those indicated in the examples.

Instead of carrying out the reaction in a corrodible steel or iron vessel, a non-ferrous vessel may be used, such as nickel or silver. In such case iron wire, turnings, powder or filings are added to the reaction mixture so that iron will be present during the reaction.

The new product is a convenient intermediate from which to make various derivatives, such as its nitro and amino derivatives, or the compound may be used by itself for various purposes. While the process employs relatively large amounts of hydrofluoric acid, recoveries of the same can be made from the residual reaction mixture. Fairly good yields of the desired product in pure form are produced by the new process.

This is a continuation-in-part of my copending application Serial No. 439,242, filed April 16, 1942, Patent No. 2,378,453.

From the foregoing disclosure it will be recognized that the invention is susceptible of modification without departing from the spirit and scope thereof and it is to be understood that the invention is not restricted to the specific illustration thereof herein set forth.

I claim:

1. A styrene distilling at 75° C. under a pressure of 0.7 mm., in which the hydrogen atoms of the carbons of the open chain are substituted by one fluorine and two chlorine atoms, said styrene being at ordinary atmospheric conditions a stable liquid which does not solidify when cooled in an alcohol-ice bath.

2. The process of making dichloro-mono-fluoro-styrene which comprises mixing phenyl-pentachloro-ethane and hydrofluoric acid, and heating the mixture in the presence of iron until dichloro-mono-fluoro-styrene is formed.

3. The process in accordance with claim 2 in which the reaction mixture is confined in a closed vessel and is heated to about 150° C.

4. The process in accordance with claim 2 in which the reaction mixture contains an excess of hydrofluoric acid.

VIKTOR WEINMAYR.